United States Patent
Morimoto

(10) Patent No.: US 8,612,611 B2
(45) Date of Patent: Dec. 17, 2013

(54) PROXY APPARATUS AND OPERATION METHOD THEREOF

(75) Inventor: Masaharu Morimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 6 days.

(21) Appl. No.: 13/200,820

(22) Filed: Oct. 3, 2011

(65) Prior Publication Data

US 2012/0030364 A1    Feb. 2, 2012

Related U.S. Application Data

(63) Continuation of application No. PCT/JP2011/051421, filed on Jan. 26, 2011.

(30) Foreign Application Priority Data

Feb. 3, 2010   (JP) .................................. 2010-022107

(51) Int. Cl.
*G06F 15/16*   (2006.01)

(52) U.S. Cl.
USPC .......................................... 709/228; 709/250

(58) Field of Classification Search
USPC ........................................................ 709/228
See application file for complete search history.

(56) References Cited

U.S. PATENT DOCUMENTS

| | | |
|---|---|---|
| 7,100,200 B2 | 8/2006 | Pope et al. |
| 2002/0194473 A1 | 12/2002 | Pope et al. |
| 2005/0080907 A1 | 4/2005 | Panasyuk et al. |
| 2005/0198379 A1 | 9/2005 | Panasyuk et al. |
| 2005/0198380 A1 | 9/2005 | Panasyuk et al. |
| 2005/0220098 A1 | 10/2005 | Oguchi et al. |
| 2005/0246445 A1 | 11/2005 | Panasyuk et al. |
| 2005/0267974 A1 | 12/2005 | Panasyuk et al. |
| 2005/0273513 A1 | 12/2005 | Panasyuk et al. |
| 2006/0056406 A1 | 3/2006 | Bouchard et al. |
| 2007/0067834 A1 | 3/2007 | Saito |
| 2009/0216829 A1 | 8/2009 | Terasaki |
| 2010/0077106 A1 | 3/2010 | Komikado et al. |
| 2010/0284404 A1* | 11/2010 | Gopinath et al. ............. 370/392 |

FOREIGN PATENT DOCUMENTS

| | | |
|---|---|---|
| JP | 2000-101640 A | 4/2000 |
| JP | 2005-295268 A | 10/2005 |
| JP | 2007-128349 A | 5/2007 |
| JP | 2007-514337 A | 5/2007 |

(Continued)

OTHER PUBLICATIONS

International Search Report (ISR) (PCT Form PCT/ISA/210) dated Mar. 29, 2011.

*Primary Examiner* — John B. Walsh
(74) *Attorney, Agent, or Firm* — McGinn Intellectual Property Law Group, PLLC

(57) ABSTRACT

A proxy apparatus includes a multi-core CPU comprising a plurality of CPU cores; and an extended listen socket comprising a plurality of queues provided for the plurality of CPU cores respectively. A kernel thread and a proxy thread operate on each of the plurality of CPU cores. The kernel thread executes a receiving process of an establishment request packet of a first connection with a client terminal, assigned to a corresponding one of the plurality of CPU cores, and registers an establishment waiting socket which contained information of the first connection, on a corresponding one of the plurality of queues. The proxy thread refers to the corresponding queue, and establishes the first connection based on the establishment waiting socket when the establishment waiting socket is registered on the corresponding queue.

20 Claims, 4 Drawing Sheets

(56) References Cited

FOREIGN PATENT DOCUMENTS

| | | |
|---|---|---|
| JP | 2008-512950 A | 4/2008 |
| JP | 2008-129767 A | 6/2008 |
| JP | 2008-131584 A | 6/2008 |
| JP | 2008-134775 A | 6/2008 |
| JP | 2008-299439 A | 12/2008 |
| JP | 2009-199433 A | 9/2009 |
| WO | WO 2009/073295 A1 | 6/2009 |

* cited by examiner

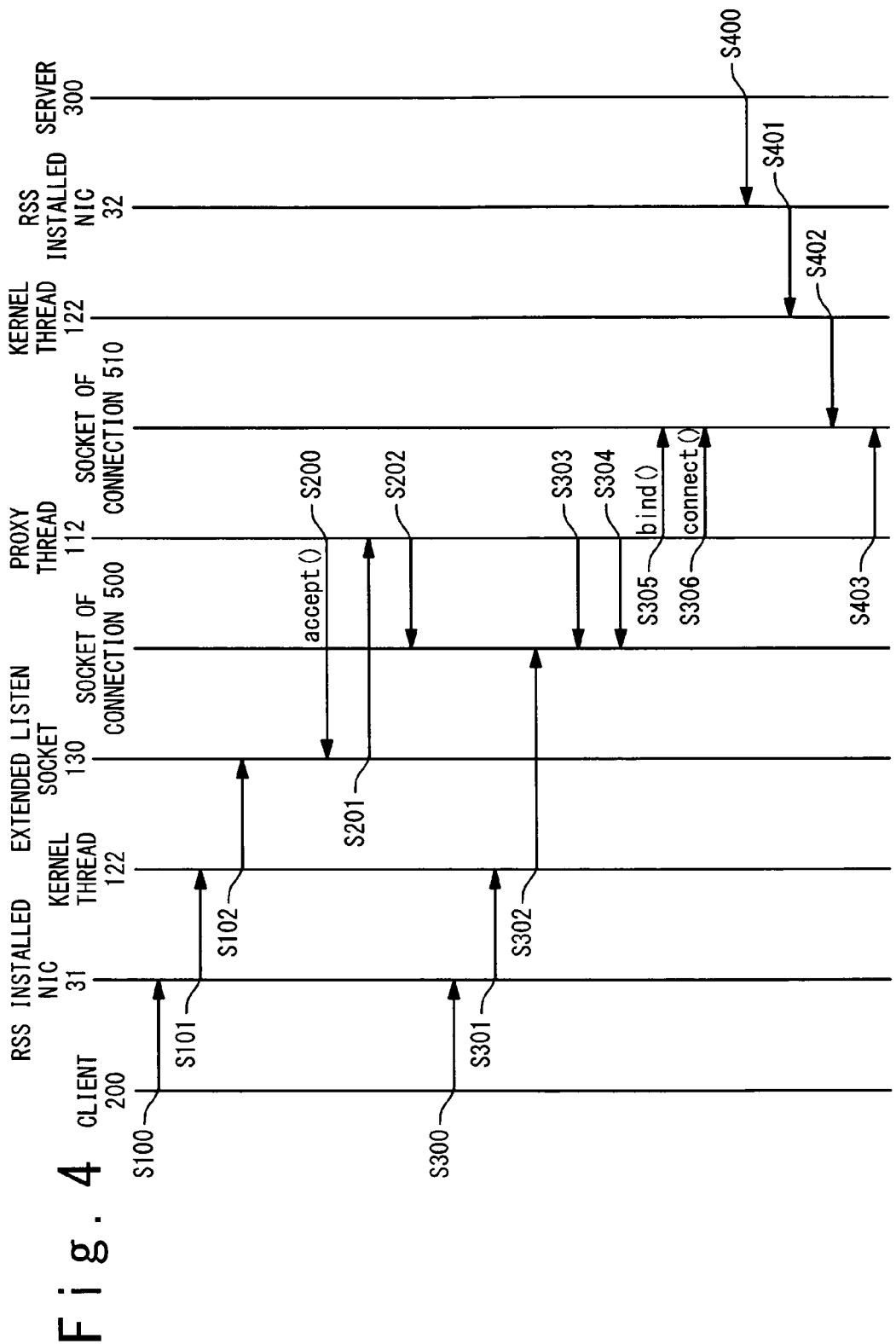

PROXY APPARATUS AND OPERATION METHOD THEREOF

CROSS-REFERENCE TO RELATED APPLICATION

This is a continuation of International Application No. PCT/JP2011/051421, filed on Jan. 26, 2011.

TECHNICAL FIELD

The present invention relates to a proxy apparatus provided with a multi-core CPU to execute a parallel process.

BACKGROUND ARTS

Improvement of an operation frequency in a CPU (Central Processing Unit) is approaching a limitation. Therefore, development of a CPU is directed to increase of cores from the improvement of the operation frequency. Under these circumstances, a multi-core CPU provided with a plurality of cores has been widespread.

A proxy apparatus is provided between a client and a server to relay a client side connection and a server side connection. Herein, the client side connection means a connection between the client and the proxy apparatus. The server side connection means a connection between the server and the proxy apparatus. Also, in this proxy apparatus, the apparatus provided with a multi-core CPU is increasing. Thus, architecture and implementation are proposed for more efficiently operating the multi-core CPU.

Also, parallelism is important to attain a high scalability by using the multi-core CPU. In the multi-core CPU, a synchronous process among the cores affects a processing ability. Therefore, in the proxy apparatus, it is necessary to perform a control so as to avoid synchronization among the CPU cores.

In case that the proxy apparatus treats two processes of the client side connection and the server side connection as two sessions, little data to be shared exists between the two sessions. Therefore, it is known that the most effective method for parallelization in such a communication is to separate the CPU cores executing processes in units of sessions. This method is referred to as "session distribution", hereinafter.

Patent Literature 1 (WO 2009/073295A) discloses a technique that a dispatcher for determining the allocation of resources for a process selects an address of a proxy apparatus in the server side connection such that packets transmitted through the two connections of the client side connection and the server side connection are processed by the same CPU core.

According to Patent Literature 1, since the dispatcher allocates the packets transmitted through the two connections to the same CPU core, the session distribution is realized, and thus, the synchronization with another CPU core is unnecessary and the scalability can be improved.

On the other hand, there exists a proxy apparatus for terminating a TCP (Transmission Control Protocol) connection. Such a proxy apparatus is realized as an application of a user space utilizing a socket.

A thread executing a proxy process in the proxy apparatus (to be referred to as "proxy thread", hereinafter) establishes the TCP connection from the client and acquires a socket related to the connection. Subsequently, the proxy thread acquires data from the socket and executes predetermined processes such as checking of data, processing, and determination of presence or absence of a cache. Then, the proxy thread generates a socket related to the server side connection and establishes the connection with the server and sends the data to the socket.

In order to realize the session distribution in such a proxy apparatus, a system generates the same number of proxy threads as the number of CPU cores. The system fixedly allocates the respective proxy threads onto the CPU cores. Thus, two socket processes related to a certain session in the client side connection and the server side connection are executed by the proxy thread operating on the same CPU core.

In this processing, information of the socket of the client side connection is added to a queue of a listen socket in a state that the connection can be established. The proxy thread executes a calling of an accept function in order to establish the connection. Thus, the socket corresponding to the connection to be established is taken out of the queue so as to establish the connection. Thereafter, the process of the connection once established is executed by the proxy thread that establishes the connection.

Therefore, a CPU core for processing a certain client side connection is determined at the time of establishing the connection. Further, since the server side connection is established after the proxy thread establishes the client side connection, two connections of the client side connection and the server side connection related to a certain session are processed by the proxy threads fixedly allocated onto the same CPU core.

Thus, the parallelization of the proxy process in a user space can be realized and a high scalability can be obtained taking advantage of a multi-core CPU.

Recently, in order to improve performance of a Web server mounted with a multi-core CPU, a NIC (Network Interface Card) appears which has a function such as Receive Side Scaling or Receive Packet Steering (these functions collectively being referred to as "RSS", hereinafter) to dynamically distribute a received packet to an available CPU core free from processing.

This RSS installed NIC has a function of calculating a hash value based on information contained in a header of the received packet and determining a CPU core to be interrupted based on the hash value.

Since packets transmitted on a certain connection include the same header information, all of the packets are assigned to the same CPU core. That is, a kernel thread executes a protocol process of each received packet by the RSS installed NIC in response to the receipt of the packet and a process up to registration of packet data into a buffer of a corresponding socket can be executed by the same CPU core.

In this manner, by using the RSS installed NIC, the processes by the kernel threads can be executed in parallel every connection and a high scalability can be obtained taking advantage of a multi-core CPU.

However, when a proxy apparatus is realized to execute a process from the receiving of packets by the RSS installed NIC to the proxy process in the user space by the same CPU core by using the method described in Patent Literature 1, the following problems exist.

A first problem is in that a CPU core for a kernel thread to operate to process a certain connection is not always the same as a CPU core for a proxy thread to operate thereon. This is because there is a possibility that the proxy thread operating on the CPU core different from the CPU core for the kernel thread to operate thereon calls an accept function in advance to establish a connection.

Once the proxy thread fixedly allocated to a different CPU core establishes a connection, the processes related to the connection are executed by the same proxy thread thereafter. Since the CPU cores for the proxy thread and the kernel thread to operate thereon are different from each other, a high speed process taking advantage of CPU cache cannot be realized.

Therefore, in order that the kernel thread and the proxy thread are executed on the same CPU core, a mechanism is needed in which a proxy thread establishes the client side connection, and the proxy thread operating on the same CPU core as the kernel thread executing a process of establishing the client side connection establishes the server side connection.

A second problem is in that since data contained in the headers of the packets belonging to two connections of the client side connection and the server side connection are different, the packets transmitted on the two connections are not always processed by the kernel thread operating on the same CPU core even though the RSS installed NIC is used.

As the RSS installed NIC provided in the proxy apparatus, a product by a third vendor is usually used. In the third vendor product, algorithms determining a distribution destination CPU core to be interrupted by the RSS installed NIC are unknown in many cases. Therefore, it is difficult to select an address of a CPU core for executing a process of the server side connection in a manner that the RSS installed NIC can allocate a packet on the client side connection and a packet on the server side connection to the same CPU core, like Patent Literature 1.

If the server side connection is allocated to the kernel thread operating on a different CPU core by the RSS installed NIC, it is necessary that the proxy thread is synchronized with the kernel thread operating on the different CPU core in a process of receiving packets on the two connections. In general, since a processing cost becomes larger in the synchronizing process between different CPU cores than in the synchronizing process in the same CPU core, the parallelism in processing requires a large cost. Also, since the CPU cores are not identical, locality of cache is lowered and the performance is degraded.

As a related technique, techniques related to improvement of a processing speed in an apparatus using a multi-core CPU are disclosed in Patent Literatures 2, 3 and 4.

CITATION LIST

[Patent Literature 1]: WO 2009/073295A
[Patent Literature 2]: JP 2009-199433A
[Patent Literature 3]: JP 2008-512950A
[Patent Literature 4]: JP 2008-134775A

SUMMARY OF THE INVENTION

A subject of the present invention is to realize a parallelized proxy apparatus which can execute a kernel process and a proxy process related to a certain session in a same CPU core.

A proxy apparatus of the present invention includes a multi-core CPU having a plurality of CPU cores, and an extended listen socket having a plurality of queues provided for the plurality of CPU cores. A kernel thread and a proxy thread operate on each of the plurality of CPU cores. The kernel thread executes a receiving process of an establishment request packet for a first connection with a client terminal, the receiving process being assigned to a corresponding one of said plurality of CPU cores, and registers an establishment waiting socket which contained information of the first connection, on a corresponding one of the plurality of queues. The proxy thread refers to the corresponding queue, and establishes the first connection based on the establishment waiting socket when the establishment waiting socket is registered on the corresponding queue.

An operation method of a proxy apparatus which includes: a multi-core CPU which having a plurality of CPU cores, a kernel thread and a proxy thread operating on each of the plurality of CPU cores; and an extended listen socket which has a plurality of queues respectively provided for the plurality of CPU cores. The operation method includes: executing a receiving process of an establishment request packet of a first connection with a client terminal, assigned to a corresponding one of the plurality of CPU cores, by the kernel thread; registering an establishment waiting socket which contains information of the first connection, on a corresponding one of the plurality of queues, by the kernel thread, referring to the corresponding queue by the proxy thread; and establishing the first connection based on the establishment waiting socket when the establishment waiting socket is registered on the corresponding queue.

According to the present invention, it is possible to realize a proxy apparatus which can execute a kernel process and a proxy process related to a certain session on a same CPU core using a multi-core CPU.

BRIEF DESCRIPTION OF THE DRAWINGS

FIG. 4 is a sequence diagram showing an operation of the proxy apparatus 100 in the exemplary embodiment of the present invention.

DESCRIPTION OF THE EXEMPLARY EMBODIMENTS

Hereinafter, a proxy apparatus according to the present invention will be described in detail with reference to the attached drawings.

(Outline)

A proxy apparatus of the present invention is provided between a client (terminal) and a server (apparatus) in a network and has a function of relaying a communication between the client and the server. The proxy apparatus includes a multi-core CPU (Central Processing Unit) having CPU cores. The proxy apparatus includes a kernel thread and a proxy thread operating on each CPU core and further includes a queue corresponding to each CPU core in a listen socket. When ending a receiving process such as a protocol process of a received packet, the kernel thread registers a connection waiting socket in a queue of the listen socket corresponding to a CPU core for the kernel thread operating thereon. Also, the proxy thread acquires the connection waiting socket from the queue in the listen socket corresponding to the CPU core for the proxy thread to operate thereon and executes a connection process.

In this manner, in the proxy apparatus of the present invention, the kernel thread and the proxy thread execute a registration process and an acquiring process of a socket to a queue in the listen socket corresponding to CPU core for the threads to operate thereon. Since a communication of a connection-established socket is processed by the same kernel thread and proxy threads thereafter, the processes are executed on the same CPU core.

Further, the proxy apparatus of the present invention includes a RSS (Receive Side Scaling or including similar functions such as Receive Packet Steering) installed NIC (Network Interface Card) for assigning the receiving process of a received packet by each CPU core. The RSS installed NIC determines a distribution destination CPU core based on header information of the received packet. In the proxy apparatus of the present invention, a predetermined mask is set to the header information to be referenced by the RSS installed NIC. Thus, the RSS installed NIC can execute a process of determining a distribution destination CPU core based on the same information of the header information for a packet received from each of the client side and the server side. Therefore, a process of a packet received from each of the client side and the server side can be assigned to the same CPU core for one communication session.

By this configuration, in the proxy apparatus of the present invention, it is possible to execute a process on the same CPU core for a packet received from each of the client side connection and the server side connection in a communication executed between the client and the server, and a synchronization is not needed between the CPU cores so that a high scalability can be realized.

Hereinafter, a configuration and operation of a proxy apparatus according to one exemplary embodiment of the present invention will be described in detail.

(Configuration)

Figure 1:
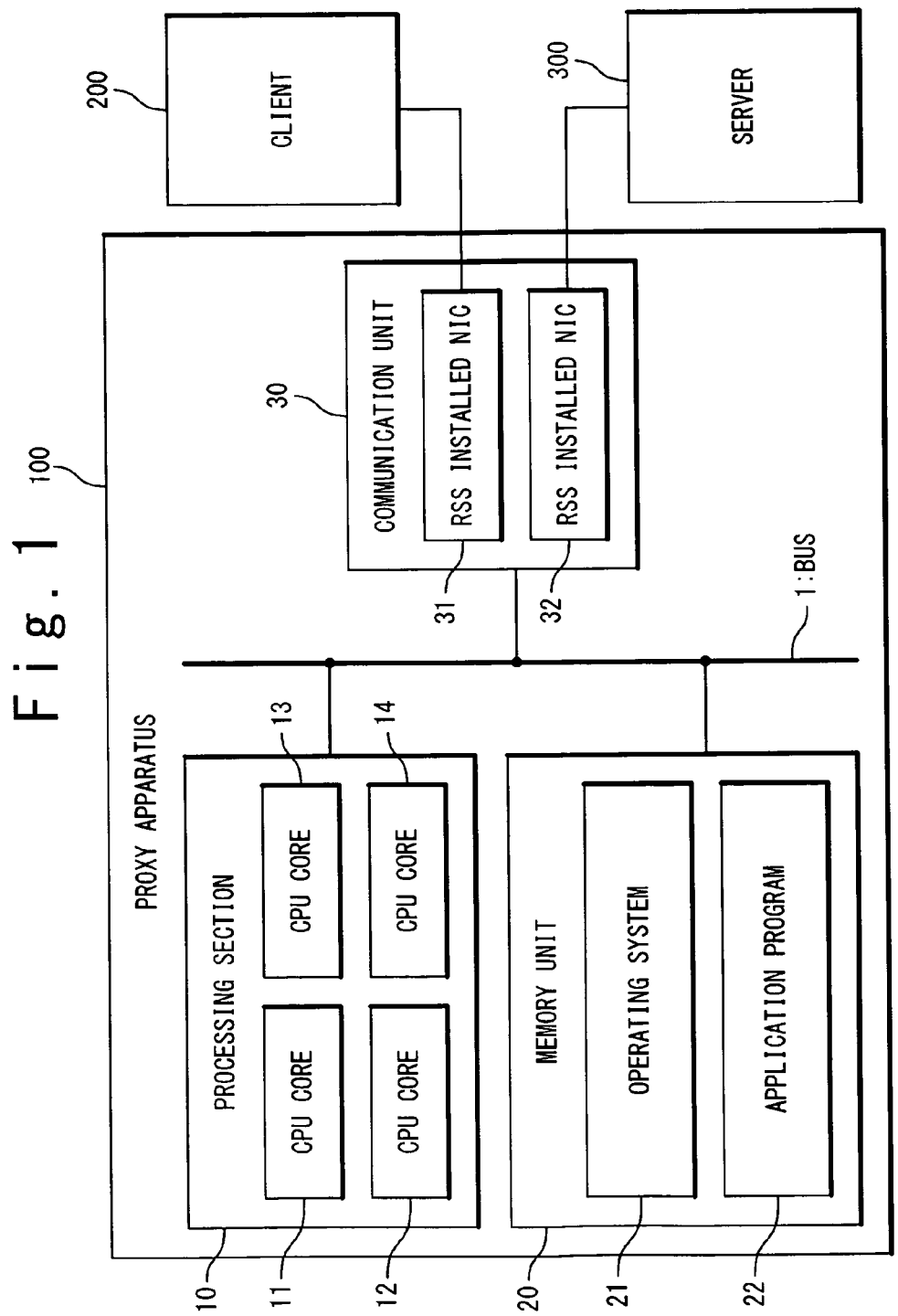
FIG. 1 is a diagram showing a configuration of a proxy apparatus 100 in an exemplary embodiment of the present invention.

First, the configuration of the proxy apparatus in the present exemplary embodiment will be described. FIG. 1 is a block diagram showing the configuration of the proxy apparatus 100 in the present exemplary embodiment. The proxy apparatus 100 of the present exemplary embodiment includes a processing section 10, a memory unit 20 and a communication unit 30. The processing section 10, the memory unit 20 and the communication unit 30 are connected via a bus 1 for sending and receiving data.

Initially, the memory unit 20 stores computer programs and various kinds of data necessary for implementing functions of the proxy apparatus 100. The memory unit 20 includes a main memory unit and an auxiliary memory unit and is composed of a RAM (Random Access Memory), a ROM (Read Only Memory) and an HDD (Hard Disk Drive). The memory unit 20 stores an operating system (to be referred to as "OS", hereinafter) 21 for controlling the proxy apparatus 100 and an application program 22 operating on the OS 21 as a computer program.

Next, the processing section 10 implements a function of the proxy apparatus 100 by executing the computer program stored in the memory unit 20. The processing section 10 is exemplified by a multi-core CPU including a plurality of cores. The processing section 10 includes four CPU cores 11 to 14 in the present exemplary embodiment. It is noted that, although the processing section 10 will be described as a multi-core CPU including four CPU cores 11 to 14, the number of the CPU cores is not limited to four, and the number thereof may be more than four or smaller.

Next, the communication unit 30 is a communication interface with an external unit. The communication unit 30 includes a RSS installed NIC 31 and a RSS installed NIC 32. The RSS installed NIC 31 is connected with the client 200 via a network (not shown) so as to make it possible to send and receive data. The RSS installed NIC 32 is connected with the server 300 via a network (not shown) so as to make it possible to send and receive data. In FIG. 1, although the client 200 and the server 300 are shown, multiple clients 200 and servers 300 are actually connected to the RSS installed NIC 31 and RSS installed NIC 32 via a network. The RSS installed NIC 31 and RSS installed NIC 32 receive packets from the client 200 and the server 300 and determine one of the CPU cores 11 to 14 which executes a receiving process of the packet, in the processing section 10.

Herein, the computer program stored in the memory unit 20 is recorded in a non-transitory recording medium. Herein, the recording medium is exemplified such as a CD (Compact Disk) and a flash memory (USB memory) provided with a USB (Universal Serial Bus) interface. The computer program can be distributed by such a recording medium. The computer program is installed in the proxy apparatus 100 via a CD drive (not shown) or the USB interface of the proxy apparatus 100. Further, the computer program may be downloadably stored in the HDD of an application server connected to a network (not shown). In this case, the computer program is introduced to the proxy apparatus via the network.

Figure 2:
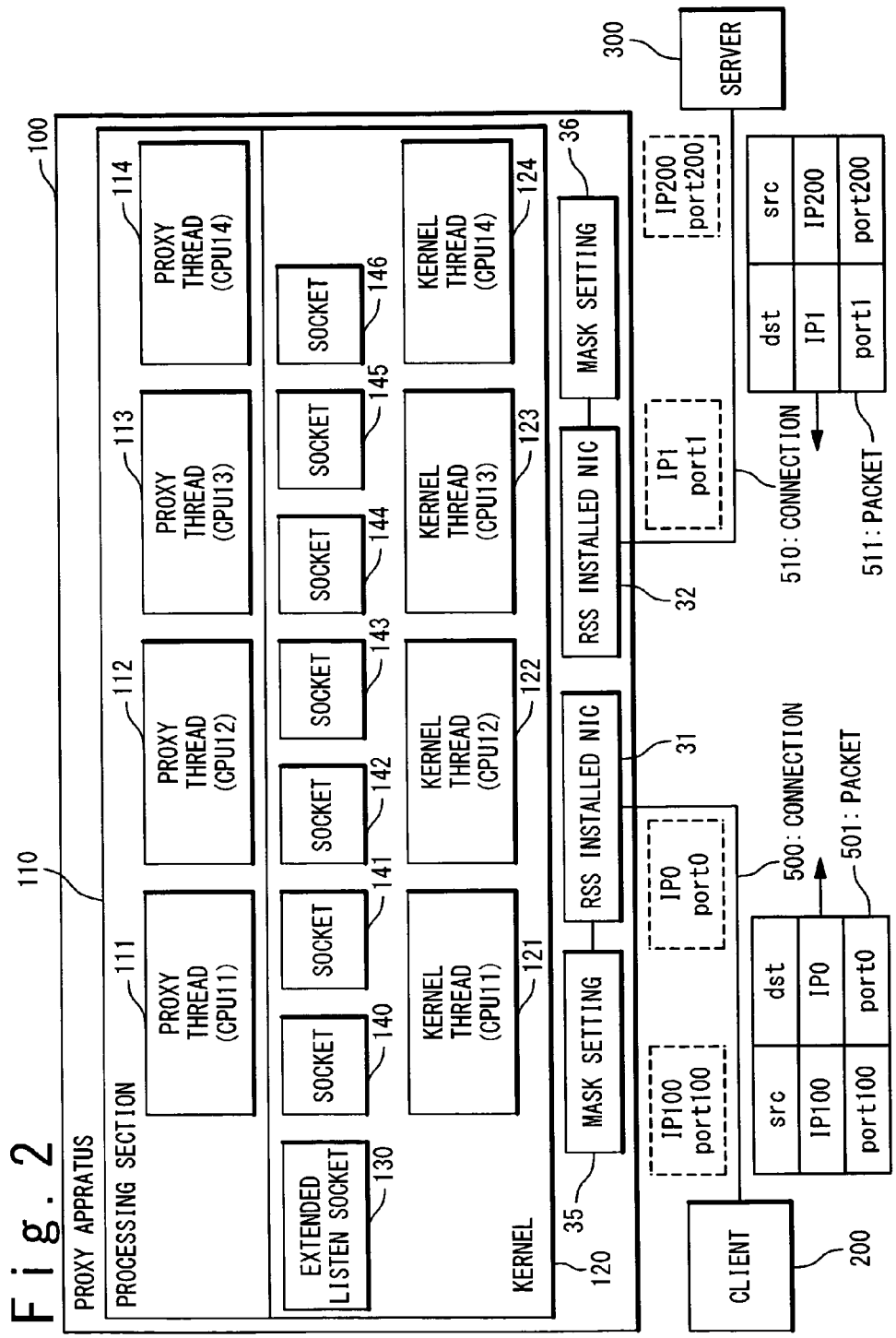
FIG. 2 is a functioning block diagram of the proxy apparatus 100 in the exemplary embodiment of the present invention.

Subsequently, FIG. 2 is a functional block diagram of the proxy apparatus 100 in the present exemplary embodiment. The proxy apparatus 100 in the present exemplary embodiment includes a processing section 110, a kernel 120, the RSS installed NIC 31, the RSS installed NIC 32 and holding sections 35 and 36 in which masks are set.

First, the kernel 120 executes a receiving process of a packet. The kernel 120 is a kernel of the OS 21. The kernel 120 includes kernel threads 121 to 124, an extended listen socket 130 and sockets 140 to 146.

The kernel threads 121 to 124 are provided for the CPU cores 11 to 14, respectively. That is, the kernel thread 121 is fixedly allocated onto the CPU core 11. Similarly, the kernel threads 122, 123 and 124 are respectively fixedly allocated onto the CPU cores 12, 13 and 14. The kernel threads 121 to 124 execute receiving processes such as protocol processes of received packets allocated to the CPU cores 11 to 14, respectively.

Figure 3:
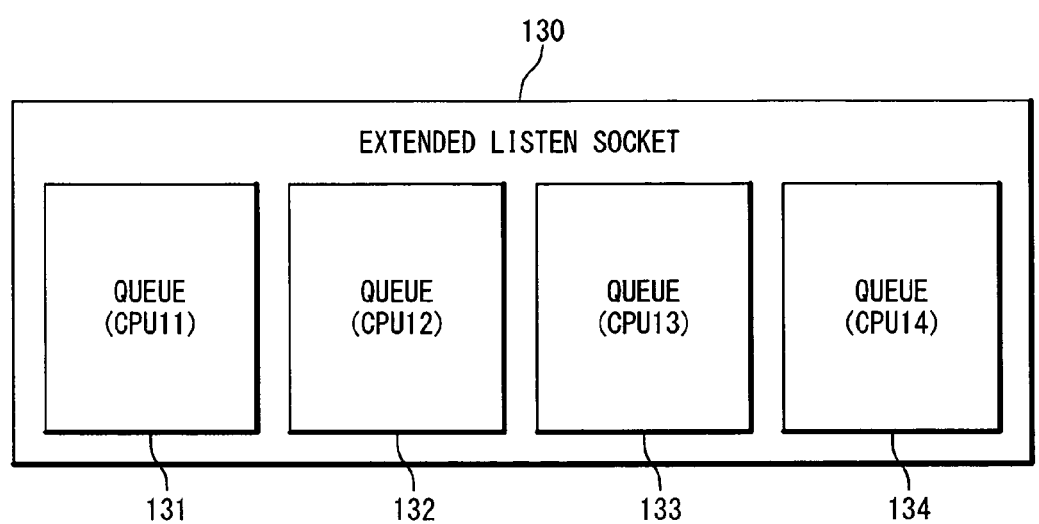
FIG. 3 is a diagram showing a configuration of an extended listen socket 130 in the exemplary embodiment of the present invention.

A connection establishment waiting socket is registered in the extended listen socket 130. The extended listen socket 130 is generated by executing a calling of a socket function. FIG. 3 is a diagram showing a configuration of the extended listen socket 130 in the present exemplary embodiment. The extended listen socket 130 of the present exemplary embodiment includes queues 131 to 134 provided for the CPU cores 11 to 14, respectively. The queues 131 to 134 store the sockets processed by the kernel threads 121 to 124 operating on the corresponding CPU cores 11 to 14, respectively.

The sockets 140 to 146 are used for processes of connections in the proxy apparatus 100. Although seven sockets 140 to 146 are shown in FIG. 2, there may be a case of providing nothing at all (zero) or more than seven sockets, since the sockets 140 to 146 are generated for the number of connections processed by the proxy apparatus 100.

Next, the processing section 110 executes a proxy process of connecting between the connections. The processing section 110 is attained by an application of the OS 21. The processing section 110 includes proxy threads 111 to 114. The proxy threads 111 to 114 are provided for the CPU cores 11 to 14, respectively. That is, the proxy thread 111 is fixedly allocated onto the CPU core 11. Similarly, the proxy threads 112, 113 and 114 are respectively fixedly allocated onto the CPU cores 12, 13 and 14.

The proxy threads 111 to 114 execute proxy processes for connection establishment waiting sockets stored in the queues 131 to 134 in the extended listen socket 130 corresponding to the CPU cores 11 to 14, respectively.

The RSS installed NICs 31 and 32 receive packets from the client 200 and the server 300 and determine CPU cores for executing receiving processes of the packets among the CPU cores 11 to 14 of the processing section 10. The RSS installed NICs 31 and 32 utilize header information masked based on the mask settings 35 and 36 as hash keys, respectively.

The mask settings 35 and 36 held in the holding sections respectively are the mask settings to be performed on the header portions of the packets when the RSS installed NICs 31 and 32 execute the receiving processes. The mask settings 35 and 36 are given as set files or commands. In the present exemplary embodiment, the mask setting 35 is a setting for masking a source port number of a packet received from the client side connection by the RSS installed NIC 31. Also, the mask setting 36 is a setting for masking a distribution destination port number of a packet received from the server side connection by the RSS installed NIC 32.

In the following description, it is assumed that a connection 500 as a client side connection is established between the proxy thread 112 and the client 200 and a connection 510 as a server side connection is established between the proxy thread 112 and the server 300. The connections 500 and 510 are established based on TCP (Transmission Control Protocol) or UDP (User Datagram Protocol). Further, an IP (Internet Protocol) address "IP100" is set in the client 200. An IP address "IP0" is set in the RSS installed NIC 31, and an IP address "IP1" is set in the RSS installed NIC 31. An IP address "IP200" is set in the server 300.

Further, the client 200 uses a port number "100" and the proxy thread 112 uses a port number "0" in the connection 500. The server 300 uses a port number "200" and the proxy thread 112 uses a port number "1" in the connection 510.

Under this setting condition, header information of packet 501 received from the connection 500 by the RSS installed NIC 31 is stored. That is, the header information of a distribution destination IP address "IP0", a distribution destination port number "0", a source IP address "IP100" and a source port number "100" is stored for the packet 501. Also, header information of the packet 511 received from the connection 510 by the RSS installed NIC 32 is stored. That is, the header information of a distribution destination IP address "IP1", a distribution destination port number "1", a source IP address "IP200" and a source port number "200" is stored for the packet 511. It should be noted that these settings represent only one example and the present invention is not limited to these settings.

The configuration of the proxy apparatus 100 in the present exemplary embodiment has been described, and the proxy apparatus operates as follows. The client 200 sends the packet 501 for a connection request of a new connection 500. In this case, the header information of the packet 501 is as shown in FIG. 2. Upon receipt of the packet 500, the RSS installed NIC 31 determines a distribution destination CPU core to be interrupted among the CPU cores 11 to 14 based on the header information of the packet 501. Here, it is assumed that the RSS installed NIC 31 determines the CPU core 12 as the distribution destination. The kernel thread 122 operating on the CPU core 12 executes a receiving process such as a protocol process of the packet 501. When preparation of establishment of the connection 500 is ready, the kernel thread 122 registers a socket associated with the connection 500 in the queue 132 corresponding to the CPU core 12 among the queues 131 to 134 in the extended listen socket 130.

Meanwhile, the proxy thread 112 operating on the CPU core 12 executes a calling of an accept function in order to accept a new connection. Upon reception of the accept function, the proxy thread 112 references to the queue 132 in the extended listen socket 130 corresponding to the CPU core 12 and confirms whether or not a connection establishment waiting socket exists in the queue 132. When the connection establishment waiting socket of the connection 500 exists in the queue 132, the proxy thread 112 acquires the socket associated with the connection 500 as a new connection as a result of calling the accept function.

Subsequently, the proxy thread 112 reads data from the socket associated with the connection 500 and executes a predetermined process such as checking of data, changing, and confirming presence or absence of a cache. Then, the proxy thread 112 starts an establishment of the connection 510 as the server side connection. The proxy thread 112 acquires a source port number "100" of the connection 500. At the time of generating the socket of the connection 510 as the server side connection, the proxy thread 112 executes a calling of a bind function to the generated socket such that the source port number of the socket becomes the same number as the source port number "100" in the connection 500. Then, the proxy thread 112 executes a calling of a connect function to the generated socket to establish the server side connection 510.

In the connection 510, the distribution destination port number is used as a hash key by the RSS installed NIC 32 and the mask setting 36. Therefore, the RSS installed NIC 32 allocates the packet 511 received from the connection 510 to the CPU core 12. Thus, the packet 511 is processed by the CPU core 12.

(Operation)

Next, an operation of the proxy apparatus 100 configured as described above will be described. FIG. 4 is a sequence diagram showing an operation of the proxy apparatus 100 in the present exemplary embodiment.

The RSS installed NIC 31 receives a packet 501 requesting an establishment of a new connection 500 from the client 200 (Step S100). The packet 501 retains the distribution destination IP address "IP0", the distribution destination port number "0", the source IP address "IP100" and the source port number "100" as the header information.

The RSS installed NIC 31 determines a distribution destination CPU core to be interrupted among the CPU cores 11 to 14 based on the header information of the packet 501 (Step S101). The RSS installed NIC 31 determines the distribution destination CPU core based on the header information masked by the mask setting 35. In the present exemplary embodiment, the mask setting 35 is the masking setting of a source port number in the header information of the packet 501. Therefore, the RSS installed NIC 31 determines the distribution destination CPU core by utilizing the source port number of the packet 501 as a hash key. It is assumed that the RSS installed NIC determines the CPU core 12 as the distribution destination.

The kernel thread 122 operating on the CPU core 12 acquires the packet 501 from the RSS installed NIC 31 to execute the receiving process such as a protocol process. The kernel thread 122 repeats the steps S100 to S101 until the establishment of the connection 500 becomes possible. When the establishment of the connection 500 becomes possible, the kernel thread 122 stores socket information related to the connection 500 in the extended listen socket 130 (Step S102). At this time, the kernel thread 122 stores the socket information containing information related to the connection 500 in the queue 132 corresponding to the CPU core 12 for the kernel thread 122 to operate thereon.

Meanwhile, the proxy threads 111 to 114 execute a confirming operation by periodically referring to the queues 131 to 134 in the extended listen socket 130 while executing a calling of a poll function and a select function. Upon detecting that the socket information for establishing the new connection 500 stored in the queue 132, the proxy thread 112 executes a calling of the accept function to the extended listen socket 130 (Step S200).

If the proxy thread 112 succeeds in calling the accept function, the proxy thread 112 receives a socket of the new connection 500 from the extended listen socket 130 (Step S201). It is assumed here that the socket 140 is the socket of the connection 500. After that, the proxy thread 112 executes read and write of data to the socket 140 with respect to a communication in the connection 500 (Step S202). Thereafter, the socket 140 is used for the communication with the client 200. The socket 140 is processed by the proxy thread 112 that has accepted the socket 140.

Subsequently, the client 200 sends data by the packet 501 through the connection 500 (Step S300). The RSS installed NIC 31 receives the packet 501 from the client 200. The RSS installed NIC 31 determines the distribution destination CPU core 12 based on the header information contained in the packet 501 received from the client 200 and the source port number according to the mask setting 35. Similarly to Step S101, since the distribution destination CPU core 12 is determined by use of the source port number as the hash key, the RSS installed NIC 31 determines the CPU core 12 as the distribution destination to be interrupted in a similar manner as described above.

When the interruption occurs in the CPU core 12 by the RSS installed NIC 31, the kernel thread 122 operating on the CPU core 12 receives the packet 501 and executes the receiving process such as a protocol process to the packet 501 (Step S301). The kernel thread 122 writes data related to the packet 501 in the socket 140 corresponding to the connection 500 (Step S302).

The proxy thread 112 reads data from the socket 140 and executes a predetermined process such as verification of data, security check, and confirming whether a cache is present or absent (Step S303).

The proxy thread 112 acquires a source port number of the connection 500 as the client side connection from the socket 140 before establishing the connection 510 as the server side connection (Step S304).

The proxy thread 112 generates a socket of the connection 510. It is assumed here that the proxy thread 112 generates the socket 141. The proxy thread 112 executes a calling of a bind function to the socket 141 to thereby establish the source port number of the connection 500 acquired at Step S304 as a source port number of the connection 510 (Step S305).

The proxy thread 112 executes a calling of a connect function to the socket 141 in which the port number same as the source port number of the connection 500 is established to thereby start the establishment of the connection 510 (Step S306). After a system call of the socket 141 is called, there is a case that the protocol process in the kernel at the time of sending is executed in a context of the proxy thread 112 or executed in a context of the kernel thread 122. In any case, the protocol process is executed on the CPU core 12.

Subsequently, the server 300 sends data by the packet 511 through the established connection 510 (Step S400). The RSS installed NIC 32 determines the distribution destination CPU core based on the header information stored in the packet 511 received from the server 300 and distribution destination port number according to the mask setting 36. At this time, the distribution destination port number stored in the packet 511 is identical to the source port number stored in the packet 501. Therefore, the RSS installed NIC 32 determines the CPU core 12 as the distribution destination CPU core. Thus, the packet 501 received through the connection 500 from the client 200 and the packet 511 received through the connection 510 from the server 300 are both processed on the similar CPU core 12.

If the interruption from the RSS installed NIC 32 occurs in the CPU core 12, the kernel thread 122 operating on the CPU core 12 receives the packet 511 and executes the receiving process such as the protocol process to the packet 511 (Step S401). The kernel thread 122 writes data related to the packet 511 in the socket 141 corresponding to the connection 510 (Step S402).

The proxy thread 112 reads the data from the socket 141 and receives the data sent from the server (Step S403). Then, the proxy thread 112 sends the data from the server to the client 200 through the connection 500.

The proxy apparatus in the present exemplary embodiment has been described. According to the proxy apparatus of the present invention, in an environment using an RSS installed NIC, a certain connection is processed by a kernel thread and a proxy thread operating on the same CPU core. Therefore, a locality of a cache of a CPU core is improved so as to achieve a low overhead process. This is because the extended listen socket includes the queues of a number equal to the number of CPU cores. By this arrangement, each proxy thread is rendered to execute a process to a queue provided in the extended listen socket in correspondence with the CPU core for the proxy thread to operate thereon in a calling of an accept function at a time of establishing a connection from the client.

Further, according to the proxy apparatus of the present invention, in an environment using a RSS installed NIC, it is not needed to synchronize between a proxy thread and a kernel thread operating on different CPU cores in order to improve the parallelism, and the processes thereof are executed on the same CPU core so that the locality of a cache of CPU can be improved to thereby improve a performance of the proxy apparatus. This is because the proxy apparatus includes two RSS installed NICs exclusively processing the client side connection and the server side connection, respectively. The RSS installed NIC used for the client side connection is used as a mask setting for a source port number of the header information of the packet. Also, the RSS installed NIC used for the server side connection is subjected to a mask setting such that a distribution destination port number is used as a hash key in header information of the packet. Furthermore, at the time of executing a connection establishment of the server side connection, the proxy thread retains a source port number of the client side connection so as to be used as a source port number in a socket of the server side connection in calling a bind function to thereby establish the connection. Therefore, two connections related to a session between a client and a server can be processed by the kernel thread on the same CPU core.

In the above description, although the present invention has been described with reference to the exemplary embodiments, the present invention is not limited to the above exemplary embodiments. Various modifications can be made by those skilled in the art within the scope of the present invention.

This patent application claims a priority on convention based on Japanese Patent Application No. 2010-022107 filed on Feb. 3, 2010, and the disclosure thereof is incorporated herein by reference.

What is claimed is:

1. A proxy apparatus, comprising:
 a multi-core CPU comprising a plurality of CPU cores; and
 an extended listen socket comprising a plurality of queues provided for said plurality of CPU cores respectively, wherein a plurality of kernel threads is provided for said plurality of CPU cores respectively, wherein a plurality of proxy threads is provided for said plurality of CPU cores respectively, wherein one of said plurality of kernel threads executes a receiving process of an establishment request packet for a first connection with a client terminal, the receiving process being assigned to a corresponding one of said plurality of CPU cores, said one of said plurality of kernel threads corresponding to said corresponding one of said plurality of CPU cores, and registers an establishment waiting socket which contained information of said first connection, on one of said plurality of queues, said one of said plurality of queues corresponding to said corresponding one CPU core, and wherein one of said plurality of proxy threads refers to said one queue, said one of said plurality of proxy threads corresponding to said corresponding one CPU core, and establishes said first connection based on said establishment waiting socket when said establishment waiting socket is registered on said one queue.

2. The proxy apparatus according to claim 1, further comprising:

a first NIC (Network Interface Card) connected with said client terminal and configured to determine as a first specification CPU core, one of said plurality of CPU cores which performs processing of a client side packet based on header information of said client side packet, when receiving said client side packet;

a second NIC connected with a server unit and configured to determine as a second specification CPU core, one of said plurality of CPU cores which performs processing of a server side packet based on header information of said server side packet, when receiving said server side packet;

a first mask holding section configured to hold a first mask setting which comprises a mask to the header information of said client side packet, when said first NIC determines said first specification CPU core; and a second mask holding section configured to hold a second mask setting which comprises a mask to the header information of said server side packet, when said second NIC determines said second specification CPU core, and wherein said first mask setting and said second mask setting are set such that said first NIC and said second NIC determine said first and second specification CPU cores based on identical information.

3. The proxy apparatus according to claim 2, wherein said first mask setting is set to mask a transmission source port number in said header information of said client side packet, and said second mask setting is set to mask a transmission source port number in said header information of said server side packet.

4. The proxy apparatus according to claim 1, wherein when establishing a second connection with said server, said second connection pairing with said first connection, said one proxy thread sets the transmission source port number in said first connection to the transmission source port number in said second connection.

5. An operation method of a proxy apparatus which comprises:

a multi-core CPU which having a plurality of CPU cores, wherein a plurality of kernel threads is respectively provided for said plurality of CPU cores and a plurality of proxy threads is respectively provided for said plurality of CPU cores; and an extended listen socket which has a plurality of queues respectively provided for said plurality of CPU cores, said operation method comprising:

executing a receiving process of an establishment request packet of a first connection with a client terminal, assigned to a corresponding one of said plurality of CPU cores, by one of said plurality of kernel threads, said one of said plurality of kernel threads corresponding to said corresponding one of said plurality of CPU cores;

registering an establishment waiting socket which contains information of said first connection, on one of said plurality of queues, said one of said plurality of queues corresponding to said corresponding one CPU core, by said one kernel thread, referring to said one queue by one of said plurality of proxy threads, said one of said plurality of proxy threads corresponding to said corresponding one CPU core; and establishing said first connection based on said establishment waiting socket when said establishment waiting socket is registered on said one queue.

6. The operation method of the proxy apparatus according to claim 5, further comprising:

receiving a client side packet by a first NIC (Network Interface Card) connected with said client terminal;

setting a first mask to header information of said client side packet by said first NIC;

determining as a first specification CPU core, one of said plurality of CPU cores which performs processing of said client side packet based on the header information of said client side packet, by said first NIC;

receiving a server side packet by a second NIC connected with said server;

setting a second mask to header information of said server side packet by said second NIC; and determining as a second specification CPU core, one of said plurality of CPU cores which performs processing of said server side packet based on the header information of said server side packet, by said second NIC.

7. The operation method according to claim 6, wherein said setting a first mask comprises:

setting said first mask to mask a transmission source port number in said header information of said client side packet, and wherein said setting a second mask comprises:

setting said second mask to mask a transmission source port number in said header information of said server side packet.

8. The operation method according to claim 5, further comprising:

setting the transmission source port number in said first connection to the transmission source port number in said second connection by said one proxy thread, when establishing a second connection with said server, said second connection pairing with said first connection.

9. A computer-readable non-transitory recording medium which stores a computer-executable program code to attain an operation method of a proxy apparatus, wherein said proxy apparatus, comprises a multi-core CPU which comprising a plurality of CPU cores, wherein a plurality of kernel threads is respectively provided for said plurality of CPU cores and a plurality of proxy threads is respectively provided for said plurality of CPU cores, and an extended listen socket which comprises a plurality of queues respectively provided for said plurality of CPU cores, wherein said operation method comprising:
executing a receiving process of an establishment request packet of a first connection with a client terminal, assigned to a corresponding one of said plurality of CPU cores, by one of said plurality of kernel threads, said one of said plurality of kernel threads corresponding to said corresponding one of said plurality of CPU cores;

registering an establishment waiting socket which contains information of said first connection, on one of said plurality of queues, said one of said plurality of queues corresponding to said corresponding one CPU core, by said one kernel thread;

referring to said one queue by one of said plurality of proxy threads, said one of said plurality of proxy threads corresponding to said corresponding one CPU core; and establishing said first connection based on said establishment waiting socket when said establishment waiting socket is registered on said one queue.

10. The computer-readable non-transitory recording medium according to claim 9, wherein said operation method further comprises:
receiving a client side packet by a first NIC (Network Interface Card) connected with said client terminal;
setting a first mask to header information of said client side packet by said first NIC;
determining as a first specification CPU core, one of said plurality of CPU cores which performs processing of said client side packet based on the header information of said client side packet, by said first NIC;
receiving a server side packet by a second NIC connected with said server;
setting a second mask to header information of said server side packet by said second NIC; and
determining as a second specification CPU core, one of said plurality of CPU cores which performs processing of said server side packet based on the header information of said server side packet, by said second NIC.

11. The computer-readable non-transitory recording medium according to claim 10, wherein said setting a first mask comprises:
setting said first mask to mask a transmission source port number in said header information of said client side packet, and
wherein said setting a second mask comprises:
setting said second mask to mask a transmission source port number in said header information of said server side packet.

12. The computer-readable non-transitory recording medium according to claim 9, further comprising:
setting the transmission source port number in said first connection to the transmission source port number in said second connection by said one proxy thread, when establishing a second connection with said server, said second connection pairing with said first connection.

13. The proxy apparatus according to claim 1, wherein, in the proxy apparatus, a processing for a communication is executed by a same kernel thread of the kernel threads and a same proxy thread of the proxy threads on a same CPU core of the CPU cores.

14. The proxy apparatus according to claim 1, wherein, in the proxy apparatus, a number of said plurality of kernel threads is the same as a number of said plurality of CPU cores such that each one of said plurality of kernel threads corresponds to each one of said plurality of CPU cores.

15. The proxy apparatus according to claim 14, wherein, in the proxy apparatus, a number of said plurality of queues is the same as the number of said plurality of CPU cores such that each one of said plurality of queues corresponds to said each one of said plurality of CPU cores.

16. The proxy apparatus according to claim 15, wherein, in the proxy apparatus, a number of said plurality of proxy threads is the same as the number of said plurality of CPU cores such that each one of said plurality of proxy threads corresponds to said each one of said plurality of CPU cores.

17. The operation method of the proxy apparatus according to claim 5, wherein, in the proxy apparatus, a processing for a communication is executed by a same kernel thread of the kernel threads and a same proxy thread of the proxy threads on a same CPU core of the CPU cores.

18. The proxy apparatus according to claim 5, wherein, in the proxy apparatus:
a number of said plurality of kernel threads is the same as a number of said plurality of CPU cores such that each one of said plurality of kernel threads corresponds to each one of said plurality of CPU cores;
a number of said plurality of queues is the same as the number of said plurality of CPU cores such that each one of said plurality of queues corresponds to said each one of said plurality of CPU cores; and
a number of said plurality of proxy threads is the same as the number of said plurality of CPU cores such that each one of said plurality of proxy threads corresponds to said each one of said plurality of CPU cores.

19. The computer-readable non-transitory recording medium according to claim 9, wherein, in the proxy apparatus, a processing for a communication is executed by a same kernel thread of the kernel threads and a same proxy thread of the proxy threads on a same CPU core of the CPU cores.

20. The computer-readable non-transitory recording medium according to claim 9, wherein, in the proxy apparatus:
a number of said plurality of kernel threads is the same as a number of said plurality of CPU cores such that each one of said plurality of kernel threads corresponds to each one of said plurality of CPU cores;
a number of said plurality of queues is the same as the number of said plurality of CPU cores such that each one of said plurality of queues corresponds to said each one of said plurality of CPU cores; and
a number of said plurality of proxy threads is the same as the number of said plurality of CPU cores such that each one of said plurality of proxy threads corresponds to said each one of said plurality of CPU cores.

* * * * *